United States Patent [19]
Thomason et al.

[11] 3,983,929
[45] Oct. 5, 1976

[54] HEAT OR COLD AND DRY STORAGE

[76] Inventors: Harry Emmitte Thomason; Harry Jack Lee Thomason, Jr., both of 6802 Walker Mill Road, SE., Washington, D.C. 20027

[22] Filed: Dec. 22, 1972

[21] Appl. No.: 317,764

[52] U.S. Cl. ............................... 165/18; 126/271; 126/400; 165/48; 165/50; 165/104 S
[51] Int. Cl.² ........................................ F24D 11/00
[58] Field of Search ................. 165/18, 104, 48, 49, 165/22, 50, 2; 126/271, 400

[56] References Cited
UNITED STATES PATENTS

| | | | |
|---|---|---|---|
| 2,396,338 | 3/1946 | Newton | 165/104 |
| 2,559,869 | 7/1951 | Gay | 165/49 |
| 2,680,565 | 6/1954 | Gof | 165/18 |
| 2,713,252 | 7/1955 | Jackson et al. | 165/18 |
| 2,723,083 | 11/1955 | Bary | 165/18 |
| 2,856,506 | 10/1958 | Telkes | 126/400 |
| 3,236,294 | 2/1966 | Thomason | 165/48 |
| 3,244,223 | 4/1966 | Edwards | 165/50 |
| 3,254,702 | 6/1966 | Thomason | 165/48 |
| 3,254,703 | 6/1966 | Thomason | 165/48 |
| 3,262,493 | 7/1966 | Hervey | 165/18 |
| 3,295,591 | 1/1967 | Thomason | 126/400 |
| 3,369,541 | 2/1968 | Thomason | 126/271 |

*Primary Examiner*—Charles J. Myhre
*Assistant Examiner*—Daniel J. O'Connor

[57] ABSTRACT

Storage apparatus is used for storage of large quantities of heat, or for large quantities of "cold," and "dryness," or for simultaneous storage of heat and cold, and dryness. The heat, or cold, or both, may be produced during off-peak power periods, or by solar energy, or both. One example of utility of the invention is for use during the winter to store solar produced heat, or during the summer for cold storage produced by solar energy or by nighttime off-peak electric power. And, for springtime or autumn weather, the apparatus is usable to simultaneously store heat and cold. Then, for a chilly night or a cold spell, stored heat is available, or for a hot evening or a hot spell, stored coldness is available. Thus, the system for climate control of the home or other space may be switched from heating to air conditioning instantly.

Zone heating and air conditioning are provided. Also low velocity, gentle currents of warm air are provided for winter heating, and high-speed cooling breezes of air for summer cooling. Further, if no fuel could be obtained for auxiliary heat, or other unfavorable conditions were to limit the heat supply, one portion or Zone may be heated and another left unheated to conserve available heat.

8 Claims, 2 Drawing Figures

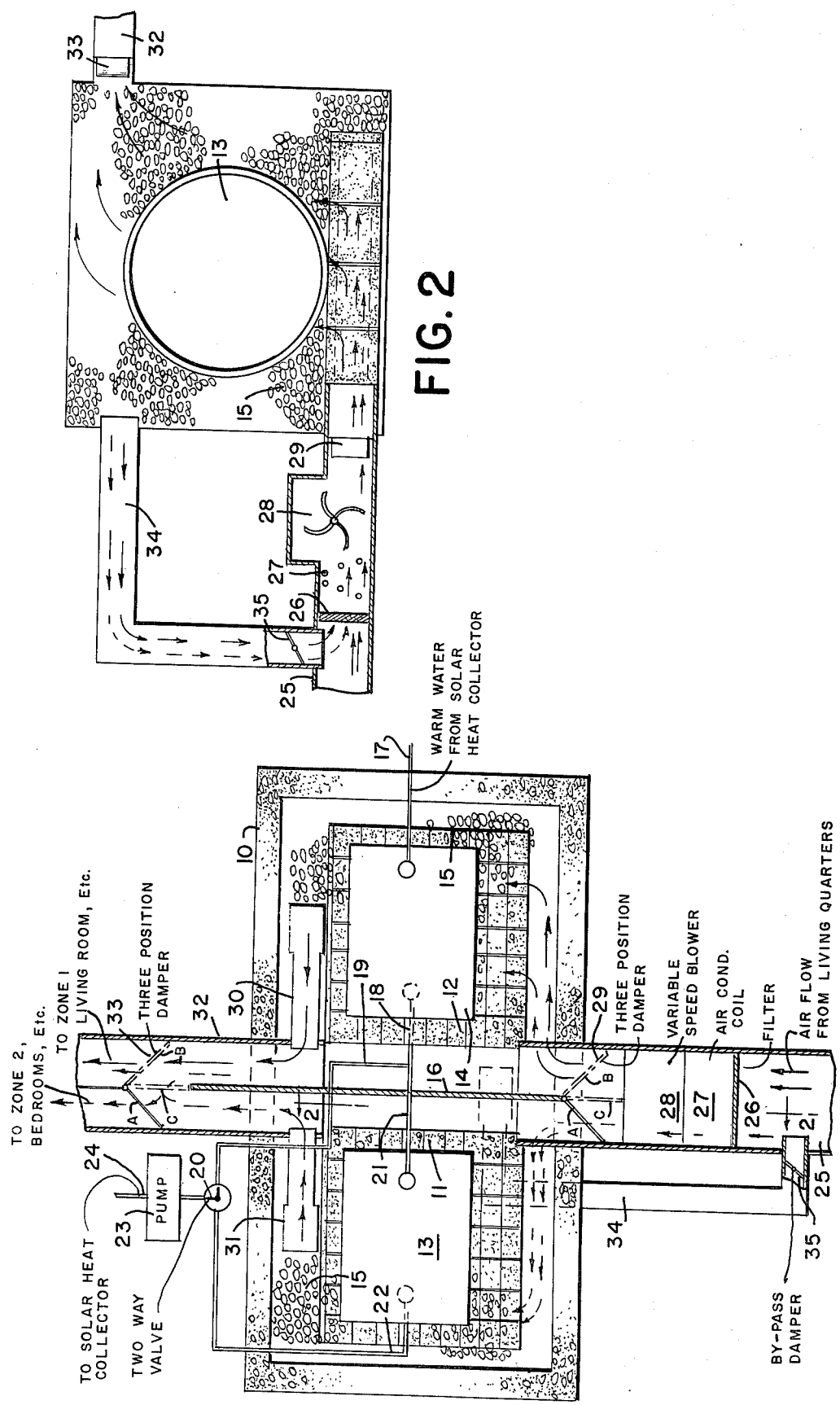

HEAT OR COLD AND DRY STORAGE

INTRODUCTION

A number of solar heating systems are in use and others are being constructed, some with cooperating air conditioning systems. As at present, almost all of those systems use heat and cold storage apparatus similar to those set out in the Thomason patents numbered U.S. Pat. Nos. 3,236,294; 3,254,702; 3,254,703; 3,295,591; 3,369,541; and 3,412,728.

Such systems have demonstrated an ability to store enough heat to keep a home warm for three to six cloudy days and nights of chilly or moderately cold weather as set out in the Solar Energy Journal, Vol. 4, No. 4, Oct. 1960, pp. 11–19, Vol. X, No. 1, Jan. 1966, United Nations Paper No. E/Conf. 35/S/3, 6 May 1961, and elsewhere. The systems have been demonstrated to be fully reversible for cold storage during the summer so that coldness produced at night can be used to cool the home on hot days, as set out in the Journal of the American Society of Heating, Refrigerating and Air-Conditioning Engineers, Nov. 1962, "Solar-Heated House Uses ¾ HP For Air Conditioning."

In addition to heat storage and cold storage, Thomason has also invented dry storage so that moisture, as well as heat, can be absorbed, by materials such as dry cold stones, on a hot humid day. The coldness and dryness may be produced at night or at other off-peak power periods.

Instant switchover from heating to cooling, or back to heating, during changeable weather, is needed at times. A solution to that problem is described by Harry E. Thomason and Harry Jack Lee Thomason, Jr., in "Solar House Plans" published late 1972 by Edmund Scientific Company, Barrington, N.J., 08007. Another approach to instant switchover is described hereinafter. Also, Zone heating and cooling, with widely variable flow rates of air for heating and cooling, is set out below.

BRIEF SUMMARY

Multiple heat and cold storage compartments permit all of the capacity of the system to be utilized for heat storage, or all for cold and dry storage, or simultaneous heat and cold storage for alternate use. Many compartments may be used, or only a few. For simplicity of discussion two compartments are illustrated and described herein. Both may be used for heat storage (wintertime for example), or both for cold storage (summertime for example), or one for heat and one for cold for hot days and cold nights, or for changeable autumn and springtime weather.

A typical home may be considered as having two zones of human occupancy. One Zone, the bedroom area, is generally occupied at night and another Zone, the living area (living room, dining room, kitchen, etc.) is generally occupied during the day and evening. Zone heating during the winter, as described hereinafter, uses a little less heat for the unoccupied Zones during non-use and thereby conserves heat energy. It similarly conserves coldness for summertime cooling and thus reduces energy usable for air conditioning.

For human comfort a high flow rate of cooling air is needed during the hot summer. However, for wintertime heating, the warm currents of air should flow slowly and gently so as not to chill the occupants. That is very important in a solar heating system where low temperature air is used for heating a home or other building occupied by people. The present system provides wide variations of flow rates for the heating and cooling seasons.

IN THE DRAWING

FIG. 1 is a diagrammatic illustration of a plan view of the invention;

FIG. 2 is a diagrammatic illustration substantially along line 2—2 of FIG. 1.

Heat or cold storage apparatus 10 comprises two or more compartments 11, 12 with liquid storage containers or tanks 13, 14 and stones, containers of heat-of-fusion storage material, or other illustrated at 15. A wall 16, of insulating material, is preferably constructed between the compartments.

Warm liquid, from a solar heat collector for example, flows into tank 14, near its top, by way of conduit 17 and flows out, from near its bottom, by conduit 18. From 18 the liquid may pass through line 19 directly to valve 20, or may flow through line 21 to near the top of tank 13 and thence, from near the bottom, through line 22 to valve 20. Pump 23 draws liquid from tank 14 or tank 13, depending on the setting of valve 20, and sends the liquid through line 24 to a solar heat collector or other source of heat.

Air from spaces to be heated or cooled is drawn in at 25 through filter 26 and air conditioning coil 27 by blower 28. Blower 28 is preferably one of the multi-speed, multi-capacity type. Air from blower 28 passes multi-position damper 29 and enters the storage compartments as follows. With damper 29 in position A, the air flow is directed to compartment 12, or in position B the air flows to compartment 11, or in position C the air flows to both compartments.

The air flows through one or both of compartments 11 and 12 where it is warmed (or cooled) and passes out through ducts 30, 31 and 32. Multi-position damper 33 may be set in position A to direct the warmed or cooled air primarily to Zone 1; for example, the living room, dining room and kitchen of a home. Or, damper 33 may be set in position B to direct the air to Zone 2, the bedrooms of a home for example. Or, damper 33 may be set in position C to allow the air to flow to both Zones.

For convenience of illustration multi-position pivoted dampers 29 and 33 are shown and described. Multi-position rotary or sliding dampers could be used. However, other apparatus could be used to achieve the functions. As an example, a damper in branch 30 and another in branch 31 could be used. One damper could be opened to permit air to flow to Zone 1, or the other for Zone 2, or both could be opened for air flow to both Zones. Similarly two dampers could be used to replace damper 29. Any of the dampers may be automatically power operated, or manually operated as desired. Some of the damper settings could remain the same for months, such as an entire heating or cooling season. Therefore, automatic power operation may be dispensed with if desired in the interest of lower cost and simplicity.

Bypass line 34 and damper 35 permit recirculation of air at times. For example, during the cooling cycle the air may be recirculated at times through the cooling coil 27 for further cooling and dehumidification of the materials in the storage compartment or compartments. This permits greater storage of coolness and dryness at times when there is very little or no need for cooling of the home.

MODES OF OPERATION

1. FULL WINTER HEATING: Set dampers 29 and 33 in position C and set valve 20 to draw liquid from line 22. Cold water is pumped from tanks 13 and 14 in tandem to the solar heat collector where it is warmed. It returns through line 17 to tank 14, and thence to tank 13. The warmed tanks of water, and warmed stones therearound, contain large quantities of stored heat and large areas of heat exchange surfaces. This stored heat warms the air being blown out to the living quarters to keep the home warm on nights and cloudy days when the sun does not shine. If desired, damper 32 may be left in position C full time to warm all of the home full-time. Or, it may be swung to position A to primarily warm the Zone 1 rooms during the day and to position B to primarily warm the Zone 2 rooms at night. (With typical loose-fitting dampers, etc., some leakage will occur to warm all of the home to some extent even though Zone 1 or Zone 2 is the primary Zone being warmed.) The blower is preferably operated at low-power, low-speed, for gentle warm currents, not high-velocity air currents which chill the occupants. If no fuel can be obtained for auxiliary heat in a blizzard or other emergency then one Zone can be heated and another left unheated.

2. FULL SUMMER COOLING: Set dampers 29 and 33 in position C. The solar heat collector and pump 23 are not used. The air conditioning unit and coil 27 may be used at any time of the day, but preferably operates at night to chill and dry the air, stones 15 and tanks 13 and 14. The chilled dried stones then absorb excess heat and humidity to keep the home cool and dry on hot humid days. And, the compressor is more efficient in discharging heat on cool nights instead of hot days. Blower 28 is preferably operated at high speed so that the air is blown at greater velocity to cool the occupants of the home. If desired damper 33 may be set in position A during the daytime to cool Zone 1 and position B at night to cool Zone 2. Since all of the air is being circulated to only one Zone, that further increases the air velocity in the Zone that is being cooled and the higher velocity air feels cooler to the occupants. Further, cooling power is not wasted in cooling uninhabited Zone B, (bedrooms) during the day, or Zone A (living room, etc.) at night. If desired damper 35 may be opened when the home is cool enough to bypass air back to cooling coil 27 for further cooling and dehumidification of the air and storage materials. For unusual conditions one Zone could be cooled and another left uncooled.

3. SPRING/AUTUMN, ALTERNATE HEATING-COOLING: Set valve 20 to draw water from line 19 and tank 14 only. Thus only tank 14 and the stones in compartment 12 are warmed. Set damper 29 in position B so that the air conditioning unit and coil 27 cool the stones and tank 13 in compartment 11. Bypass damper 35 may be opened to store additional coolness in compartment 11 when little or no cooling of the home is desired. (With damper 35 open most of the air from blower 28 will be bypassed from the slightly higher pressure at the top of compartment 11 to the low pressure at suction line 25 leading to blower 28.) After compartment 12 is "charged" with heat and compartment 11 is charged with coldness and dryness, then either heating or cooling may be obtained as needed.

On a hot afternoon damper 29 is set in position B, a thermostat starts blower 28, and damper 33 is set to cool Zone 1, or Zone 2, or both, as desired. During a chilly night damper 29 is set in position A, a thermostat starts blower 28, and damper 33 is set to warm Zone 1, or Zone 2, or both, as desired.

One embodiment of the invention has been described. Other forms may be used. As one example, two blowers may be used instead of the one illustrated. Damper 29 could then be eliminated. One blower would circulate air from duct 25 to storage bin 11 and out through duct 31. The other would circulate air from duct 25 to storage bin 12 and out through duct 30. Then, during autumn and springtime changeable weather one blower may be used for heating and the other for cooling. During summer or winter both blowers may be used, at low or high speed as desired. A furnace with a blower may be used for auxiliary heat during long cloudy periods. That blower may be used as one of the blowers to achieve the method of operation just described.

If no Zone control were desired then damper 32 could be eliminated. Or, two blowers could be used for Zone control, one to draw from duct 30 and deliver to Zone 1, the other to draw from duct 31 and deliver to Zone 2.

As another variation of operation, heat may be stored and used at two levels. Bin 11 may supply heat as needed until it is substantially exhausted while bin 12 is held in reserve at high temperature. If cloudiness persists, with no replenishing of the heat supply from solar heat, then the heat from bin 12 may be used. On the other hand, if the sun comes out, the cool water from tank 13 in bin 11 is circulated to the solar heat collector. This low-temperature water is easily heated with the solar heat collector operating at high efficiency. The solar heated water returns to tank 14 in bin 12 at high temperature. This method of operation results in overall high efficiency of the system.

As still another variation of operation, instead of flowing the water through tanks 13 and 14 in tandem, a valve or valves may be used at 20 which permit water to be withdrawn from tanks 13 and 14 simultaneously and the solar heated water may flow back to both tanks simultaneously.

Although the invention has been described as utilizing air flow for transporting heat or cold from storage to the area to be heated or cooled it will be obvious that other fluids could be used, such as brine solutions, the Freons or other.

Other variations will suggest themselves to those skilled in the art.

We claim:

1. Heat or cool storage equipment comprising storage apparatus having multiple insulated compartments, means to direct warm liquid into each of said compartments for heat storage therein when maximum heat storage capacity is desired, or to a first of said compartments when less than maximum heat storage capacity is desired, a second of said compartments being left available for cool storage, and means to direct air through said apparatus in heat exchange relationship therewith to heat the air as it passes through a warm compartment or to cool the air as it passes through a cool compartment.

2. Apparatus as in claim 1 and means to cool said second compartment during periods when cooling and heating are needed alternately.

3. Apparatus as in claim 1 and means to cool said first and said second compartments when maximum cold storage capacity is desired.

4. Apparatus as in claim 1 and means to direct warmed air from said first compartment to a Zone of a space to be heated, or to another Zone, or to all such Zones.

5. Apparatus as in claim 1 and means to direct cooled air from said second compartment to a Zone of a space to be cooled, or to another Zone, or to all such Zones.

6. Apparatus as in claim 1 and means to direct air into each of said compartments individually, or all of said compartments simultaneously for heating or cooling of the air as it passes through said compartments.

7. Apparatus as in claim 6 and means to cool the air, and means to recirculate a portion of the air from one or all of said compartments back to said cooling means for further cooling.

8. Apparatus as in claim 1 and means to direct air at different flow rates into one or all of said compartments and out to Zones to be warmed or cooled.

* * * * *